United States Patent [19]

Thompson

[11] 4,436,758

[45] Mar. 13, 1984

[54] DOUGH CONDITIONING COMPOSITION

[76] Inventor: Jerome B. Thompson, Box 231 - Rte. 3, Cumberland, Md. 21502

[21] Appl. No.: 175,142

[22] Filed: Aug. 5, 1980

[51] Int. Cl.$^3$ ............................................. A21D 10/00
[52] U.S. Cl. ..................................... 426/549; 426/551; 426/653; 426/19
[58] Field of Search ......................... 426/25, 26, 19–24, 426/653

[56] References Cited

U.S. PATENT DOCUMENTS

| | | | |
|---|---|---|---|
| 3,777,038 | 12/1973 | Thompson | 426/19 |
| 3,922,350 | 11/1975 | Dockendorf | 426/25 |
| 4,109,018 | 8/1978 | Thompson | 426/19 |
| 4,109,023 | 8/1978 | Rucker et al. | 426/25 |

*Primary Examiner*—Bernard Nozick
*Attorney, Agent, or Firm*—James F. Jones

[57] ABSTRACT

The present invention is concerned with the production of new and improved dough conditioners for use in the manufacture of yeast leavened baked products. The dough conditioners of the present invention are used in concentrated form and consist of a formulation including a combination of certain organic acids and an oxidizing agent to which may be added other dough additives. The organic acids to be employed are selected from the group consisting of adipic acid, citric acid, fumaric acid, malic acid, and succinic acid. Potassium bromate is the oxidizing agent that has been found to be of greater utility in the practice of the present invention. The dough conditioner concentrate produced in accordance with the present invention has been found to be quite stable, imparts improved properties to the dough, eliminates the need for employing additive material, found oftentimes to be objectionable, and in the form used, reduces freight and storage costs and permits the use of mechanical scaling or metering devices, with a corresponding reduction in labor costs.

12 Claims, No Drawings

DOUGH CONDITIONING COMPOSITION

BACKGROUND OF THE INVENTION

There have been employed in the baking of yeast-leavened dough in times past certain chemical agents which have been added to the dough to aid in the production of the finished baked product. The presence of such chemical formulations aided in the production of carbon dioxide during the fermentation procedure as well as improving the overall baking procedure. By reason of such functions, these chemical additives were identified as yeast foods. Such yeast foods have been known for many years and were used as dough additives by bakers as early as 1915, as evidenced by U.S. Pat. No. 1,151,526 issued to Kohman et al. A formula for such a yeast food suggested at this early date is as follows:

Calcium Sulfate: 26.2%
Sodium Chloride: 22.3%
Flour: 41.7%
Ammonium Chloride: 9.5%
Potassium Bromate: 0.26%

The recommended usage of this formulation was about 6.7 ounces per 100 pounds of flour. This formulation was not employed as a concentrate and significantly the potassium bromate in this formulation amounted to about 11 ppm of the flour.

The commercial use of yeast foods has continued from that date and two types of such yeast food have been widely recognized as evidenced by the publication "Baking Science And Technology"—Pyler—Siebel Publishing Co., Chicago, Ill. (1952), Volume 1. Typical formulations identified in the publication as being suitable for use are set forth below with each type being identified by its designated name:

| The Arkady Type | | The Fermaloid Type | |
|---|---|---|---|
| Calcium Sulfate | 25% | Calcium Acid Phosphate | 50% |
| Sodium Chloride | 25% | Sodium Chloride | 19.35% |
| Starch | 40% | Starch | 23.43% |
| Ammonium Chloride | 9.7% | Ammonium Sulfate | 7.0% |
| Potassium Bromate | .3% | Potassium Bromate | .12% |
| | | Potassium Iodate | .10% |

It will be noted that the bulk of each of the formulations set forth above are relatively inert fillers or diluents as evidenced by the first three ingredients employed in each. These diluents keep the chemically active ingredients in a relatively inactive state and thus such diluted compositions are reasonably stable in storage and conveniently weighable on bakery scales. A baker generally employed about 0.25–0.75% of the composition based on the flour in his baked product formulas or between about four to twelve ounces to a 100 pounds of flour.

The amount of the oxidants employed in each of the two types of yeast food listed above, i.e., the potassium bromate and the potassium bromate plus the potassium iodate, is about 7.5–23.5 ppm of flour. This amount of oxidant is on the same order of magnitude as has been recommended over sixty years ago. This fact thus indicates that the oxidant level is quite small and at relatively critical level although at constant level. The oxidant and the amount employed is therefore associated with the chemistry of the flour and its presence and function has apparently not changed greatly in the intervening years.

In recent years, a yeast food concentrate has been made available to the baking industry in the form of a small package. In this form of use, the package has consisted of a small, water-soluble film packet into which an oxidant, such as potassium bromate, and calcium sulfate, which functions as a scaling agent and which increase the safety factor of the oxidant, have been added and the packet thereafter sealed. The packet is thereafter placed within a larger film packet into which the required ammonium salt and any other desired materials have been placed and the larger packet then sealed. This arrangement produces a single package of a packet within a packet. This procedure thus effectively isolates one active ingredient from the other by physical means and virtually eliminates the need for fillers.

An example of such a "one in one" package that is commercially available is one marketed by J. F. Short Milling Company under the name of "Short Cut". In this package, the amount of total yeast food per 100 lbs. of flour that will be present will be about 23 grams. Thus, the amount used is reduced by a factor of 10. The formula of the so-called "Short Cut" package is as follows:

| "Short Cut": (Two packet concentrate) | | | |
|---|---|---|---|
| Ammonium Sulfate | 88.4% | | |
| Calcium Sulfate | 8.6% | Small Packet | Large Packet |
| Potassium Bromate | 3.0% | | |

The principal disadvantage with the double package "yeast food" system is that the edible film packets and the sealing and packaging procedures required is rather expensive. Attempts have been made to eliminate such economical disadvantage by preparing concentrates in which the ammonium salts and the oxidizer are placed in intimate admixture in a single package. However, such a unitary combination results in an additive package possessing dangerous instability such that in a relatively short time, such as, for example, about 1-2 weeks the additive package will be unsuitable for use. The reason for such inherent instability of a concentrated mixture of the type noted above appears to reside in the tendency of the ammonium salt to ionize even when in a dry state. This fact results in a conversion of the potassium bromate to ammonium bromate, which is quite unstable, and the salt into potassium chloride or potassium sulfate either of which are stable. The formed ammonium bromate would decompose to yield nitrogen, bromine gas and water, and probably very active intermediate materials. The reaction products seem to catalyze the decomposition, and such decomposition becomes progressively more rapid.

In bulk form, this reaction just described is very dangerous and even in small sealed packets the gas pressures created can rupture the packets and release noxious and corrosive fumes. The following equations explain the reaction that is believed to occur:

$$NH_4X + KBrO_3 \rightarrow KX + NH_4BrO_3$$

$$2NH_4BrO_3 \rightarrow N_2 + 2HBr + 3H_2O$$

$$5HBr + KBrO_3 \rightarrow KOH + 3Br_2 + H_2O$$

The interest in the use of concentrated yeast foods by the baking industry in bulk powdered form has been caused by the availability of very accurate mechanical feeders which can be set to deliver a predetermined weight of such ingredients into the flour conveying system of a modern bakery with the efficiency and economy that makes the use of such a product quite attractive. It is now apparent that while concentrated "yeast foods" can be made by simply removing the fillers and combining the functional ammonium salts and oxidant, such a product does not have sufficient storage life to be practicable or useful. Therefore, marketing of the mixture in bulk form has not been commercially feasible.

SUMMARY OF THE INVENTION

The present invention is concerned with the production of concentrates for use in the baking of yeast leavened dough products which are functional in all respects in the manner of the known and traditional yeast foods employed heretofore, but which, with the exception of bromates, may contain none of the ingredients heretofore considered essential in the formulation of yeast foods. By reason of this latter difference, the compounds of the present invention will be hereinafter referred to as dough conditioners. The advantages of the concentrates as dough conditioners to the baker will be found to be several. The use of the materials in concentrate form reduces the freight and storage costs, improves the cost efficiency of the function sought from the dough conditions, and permits the employment of mechanical scaling or metering devices with a corresponding material saving in labor costs. The dough conditioner compound of the present invention is comprised of two functional and mutually stable ingredients, one being an oxidant, such as, for example, potassium bromate, and the other being a selected compatible organic acid.

OXIDANT

The functionality of an oxidant in altering the characteristics of yeast-fermented wheat flour dough to aid in the production of large volumed, symmetrical and well piled loaves of bread has long been recognized in the baking industry. An oxidant that has been widely used to achieve this function is potassium bromate. In accordance with the present invention, potassium bromate is the oxidant that is preferred due to its ready availability. It is to be recognized however that sodium bromate and calcium bromate are equally functional to the same extent as potassium. The reason for this is that it is the anion that is the functional part of the molecule which aids in improving the dough. It should be noted that with respect to the latter two salts, a lesser amount would be required since the sodium and calcium bromates would have lower equivalent weights. With respect to other oxidants such as, for example, potassium iodate, such material may be comparable to a degree with the bromates. However from a cost standpoint such materials are quite expensive and are therefore not preferred for this reason.

The functionality of the bromate can also be increased by a factor of about six by the inclusion of iron ethylenedinitriolotetracetate salts, as set forth in my U.S. Pat. No. 3,777,038. Normally, however, the level of bromate that will be optimumly functional is in the range of about 13–19 ppm of wheat flour with a level of about 15 ppm being common for the usual commercial sponge and dough process of bread production. Brew processes and some high speed mixing processes will be found to require much more oxidant apparently because of the much shorter reaction times that exist with such processes. Compounds for these latter processes have been prepared but are highly specialized and are generally tailored for use in a particular bakery.

It should also be noted that other oxidizing agents, such as, for example, azodicarbonamid, potassium iodate, calcium peroxide and various persulfates, are or have been proposed as dough oxidants, but from a practical standpoint such other oxidizing agents always have been employed in combination with a bromate. The reason for this is that such other oxidants have not been found to be particularly functional when used alone nor have they been found particularly beneficial when employed in combination form in the dough conditioner made in accordance with the present invention. It is known that azodicarbonamid and potassium bromate can interact with one another and can form, in particular ratios, a particularly sensitive and brisant explosive which can be detonated by either impact or by friction. Calcium peroxide is quite unstable, and it and potassium iodate are not as functional as bromate. The potassium and ammonium persulphates are not employed in the United States as additives for dough products. Thus these other named oxidants will not be found to be useful alone or in combination with a bromate as a component in the dough conditioners of the present invention.

THE ORGANIC ACID

The organic acids that have been found to be useful as the other component part of the dough conditioning agent made in accordance with the present invention are generally recognized as safe materials for human consumption and are included in the Food Chemicals Codes II (1972) or similar publications. The organic acids to be employed in the present invention also must possess certain physical, chemical and physiological properties in order to be suitable for use in the manner intended herein. Further, the acids should be generally crystalline and friable so that they can be ground to relatively fine particle size, and also such acids must be relativey soluble in water and should possess non-hygroscopic and non-deliquescent properties. The organic acids to be employed herein should also be considerably more acid than carbonic acid and should possess an ionization constant greater than $1 \times 10^{-5}$ in order for the acid to be desirable.

Organic acids meeting the foregoing requirements are adipic, citric, fumaric, malic and succinic acids. Of these organic acids fumaric acid and malic acid are preferred. Other such acids also meeting these general requirements to some extent are sodium diacetate, sodium acid pyrophosphate and monocalcium phosphate. However, these latter acids are less desirable due to their higher equivalent weight, poor storage properties, and inferior flavor character. Therefore, these latter acids would be found less suitable for use as the other named acids in the practice of the present invention.

The present invention is basically predicated on the discovery that certain organic acids can be employed to replace the ammonium salts, which have been thought to be essential for feeding yeast, in total functionality and that the particular acids could be blended with potassium bromate to produce a stable compound having the functions of yeast foods and yet be concentrated by a factor of about 8–10. The resulting compounds produced in accordance with the present invention therefore not only possess the desired functional properties for the dough to be baked, but also possess other economic advantages, such as for example, a reduction in freight costs, storage cost reductions, labor savings and, in some instances, a saving of energy.

FORM OF PREPARATION

The dough conditioning composition made in accordance with the present invention therefore comprises two basic ingredients to wit, an oxidant, i.e., potassium bromate and a compatible solid organic acid selected from a group of certain specific organic acids. In normal practice, the ratio of the solid organic acid to the bromate salt will be about 30–100:1. The amount of the oxidant to be employed in the formulation of the dough conditioner composition will be in the range of about 0.4% to 4% and preferably in the range of about 2.4% to 3.3%. The amount of the organic acid to be employed in formulating the composition will be in the range of 60% to 98% with the preferred range being 70% to 90%.

The use of the formulated composition made in accordance with the present invention will be in the form of a concentrate. In general, the formulated composition will be employed within the range of 0.03 parts to 0.07 parts based on a 100 parts of flour used in the dough composition and this is the preferred range of the dough conditioner concentrate. It will be further found that the amount of the dough conditioner concentrate made in accordance with the present invention will be far less than the amount of conventional yeast food heretofore employed in the production of yeast leavened dough products. In general the amount of the dough conditioner concentrate made in accordance with the present invention required to achieve the desired results will be less on a weight basis than the conventional yeast food by a factor of about 8 to 10.

OTHER INGREDIENTS

In addition to the basic ingredients required for the formulation of dough conditioner concentrate of the present invention, other dough additives may be employed to impart certain improvements to the dough conditioner concentrate. Examples of such other additives are, for example, calcium phosphate, calcium sulfate or silica which, when present in minor amounts, will prevent lumping, control density and improve the flow properties of the concentrate. Such materials are insoluble and non-deliquescent. While these are illustrative of additives that may be employed, it is to be clearly understood that any well known dough additive may be used to impart certain specific properties to the dough, so long as such additives do not deleteriously affect the function of the basic dough conditioner concentrate of the present invention.

The concentrated dough conditioners made in accordance with the present invention can be preweighed for particular sizes of doughs and packed in individual water soluble film pouches made of plasticized hydroxypropylmethyl cellulose or the like, or the conditioners can be compressed into predetermined dosages for baked products in tablet form. The dough conditioners can readily be weighed in the bakery in powder form, and in the preferred formulation, as hereinbefore indicated, would be useful at about 0.05% to 0.625% (Bakers percentage). An interest in these concentrated dough conditioners as bulk powdered ingredients is due to the ready availability of very accurate mechanical feeders which can be set to deliver a predetermined amount of such conditioners directly into a flour stream. In many instances, some flow agent will be found necessary if the best results are to be obtained. When necessary, tricalcium phosphate with some calcium sulfate is the preferred material using a metering device called the Eternatron (Karib, Inc.) The above indicated continuous addition to flour has been employed to make 40,000 pound batches of dough using a brew process and replacing a Fermaloid type yeast food with complete satisfaction and for extended periods.

DETAILED DESCRIPTION OF THE PREFERRED EMBODIMENTS

A typical and preferred formulation of a dough conditioner made in accordance with the present invention and embodying the preferred aspects thereof is shown in the following example:

EXAMPLE

Potassium Bromate: 2.575%
Malic Acid: 88.183%
Tricalcium Phosphate: 3.175%
Calcium Sulfate: 5.067%
Collidal Silica: 1.000%

The above dough conditioner was formulated with fillers which were weight adjusted so that 1 ounce replaces 8 ounces of the conventional "yeast foods". The above formulation may be employed by commercial bakeries to replace both Arkady and Fermaloid type yeast foods illustrated hereinbefore with complete success. The formulation is generally satisfactory at about this level of usage in the usual sponge and dough process of bread making. At a similar or slightly higher level, the formulation will be satisfactory in the straight dough process and in variants thereof in which a brew is employed. It will be obvious that the utility of the formulation in yeast raised baked products is general and that bread is simply the most important and representative of such yeast leavened dough products.

TEST DATA

The following tests given hereinafter illustrate the improved results achieved by the use of dough conditioner concentrates made in accordance with the present invention.

A recognition of misconceptions as to the functions of ingredients in traditional yeast foods have led to a re-evaluation of such ingredients. Various calcium salts have been employed, supposedly as water corrective agents. Since those salts employed in yeast foods are virtually insoluble, their actual function or need is questionable, at least under modern conditions. Their very scanty level in successful two package concentrate type yeast food would seem to be substantiation of this belief.

Theory has maintained that the ammonium salts in yeast foods are a necessary source of nitrogen and act as a stimulant on yeast action. This concept is the basis for their inclusion in all modern yeast foods, in Arkady, Fermaloid and Short Cut types. A second potential functional property however has not generally been recognized heretofore. For example, if ammonium salts could be replaced with acids totally, then the real funtionality of the ammonium salts would be established and they could be replaced by some acid more compatible with the bromate.

There is no such question about the functionality of the oxidant and especially in the form of potassium bromate. It is used and obviously is functional as a flour component in many countries without any of the other yeast food ingredients being employed. The level of optimum functionality with a bakers patent flour of about 12% protein is established as usually being in the range of 10–30 parts per million of flour. The following acidic reacting compounds were obtained for use in preparing dough conditioning compounds:

| No. | Acid Compound | Grade | Source |
|---|---|---|---|
| 1. | Tartaric Acid | Baker 0386 | JT Baker Chem., Phillipsburg, N.J. |
| 2. | Citric Acid (Monohydrate) | Baker 0118 | JT Baker Chem., Phillipsburg, N.J. |
| 3. | Adipic Acid | Food Grade | Monsanto, St. Louis, Mo. |
| 4. | Malic Acid | FCC | Alberta Gas Chemicals, Parsippang, N.J. |
| 5. | Sodium Diacetate | FCC | Mallinckrodt, Lodi, N.J. |
| 6. | Sodium Acid Pyrophosphate | FCC SAPP #4 | Stauffer Chem. Co., Westport, Conn. |
| 7. | Fumaric Acid | Food Grade | Monsanto, St. Louis, Mo. |
| 8. | Monocalcium Phosphate | V-90 | Stauffer Chem. Co., Westport, Conn. |
| 9. | Succinic Acid | A294 | Fisher Scientific Co., Fairlawn, N.J. |
| 10. | Ammonium Chloride | Food Grade | Reagent Chem., Texas City, Tx. |
| 11. | Ammonium Sulfate | FCC 1-0800 | JT Baker Chem., Phillipsburg, N.J. |

TEST I

These acidic materials were placed into two groups based on actual or presumed equivalent weight which would be, to an extent, an indication of its ability to acidify a bread dough. The first group had equivalent weights of 58.03 to 76.03 and included acid compounds listed as Nos. 1, 2, 3, 4, 7, and 9—Table I. These acid materials were made into dough conditioner compounds in accordance with the present invention by blending the powdered acid with potassium bromate powder (TAC 8481 Mallinckrodt) in 100 gram batches using a kitchen blender. The formulas for each of the dough conditioners made were as follows:

Type 1 Conditioner

Acid: 97.0%
$KBrO_3$: 3.0%

These compounds were calculated to yield sufficient acid for pH control and to contain a near optimum amount of bromate if employed in a dough at 0.05% level. This would be a concentration by a factor of 10 as compared to yeast food usually used at the 0.5% level based on the flour present in a dough mixture.

A second group of acids, to wit, Nos. 5, 6, 8, and provisionally 10 and 11, of Table I, wherein the equivalent weights were between 110.9 and 143.08 were made into dough conditioner compounds by blending them with bromates as before in accordance with the following formula:

Type 2 Conditioner

Acid: 98.5%
$KBrO_3$: 1.5%

These formulas were also calculated to yield approximately the proper amount of acid for pH control in the dough and bread and a nearer optimum level of bromate when used at the 0.1% level based on flour. The ones containing the ammonium salts also yielded at this level about the amount of ammonium ion obtained by using 0.5% of a traditional yeast food.

It will be apparent that for the purposes of making concentrates, the second group of acids is only half as efficient as the first. It will also be apparent that, with the exception of the two containing the ammonium salts, and possibly the calcium phosphate, none of these compounds, the compounds made in accordance with the present invention can make any claim to being yeast foods or nutrients. Rather, such compounds are simply dough conditioners.

A series of bake tests were made to determine if these dough conditioners with the usual functionality ascribed to yeast foods could be made without the large amounts of calcium salts and substituting a number of available acidic reacting reagents in the place of the standard yeast food components.

The usual sponge and dough procedure or two stage dough process favored by commercial bakers for making white bread was employed. A 70% sponge was prepared using the following formula:

Sponge Formula

| Ingredient | Parts by Wt. (or Baker's Percentage) |
|---|---|
| Flour (Baker's patent) | 70 |
| Water | 42 |
| Yeast (Compressed) | 2.5 |
| Shortening (Crisco-Swift) | 2.0 |
| Yeast Food (if used) | .5 |
| Conditioner (if used) | |
| Type 1 | .05 |
| Type 2 | .10 |
| Potassium Bromate (if used) | .0015 |

The test procedure used was based on total of 700 grams of flour. The sponge ingredients were mixed together in a dough mixer to get a uniform and coherent mass which was removed from the mixer at 80° F.

Fourteen such sponges were made containing the various yeast foods or conditioners. These included six Type 1 conditioners, five Type 2 conditioners, including the two ammonium salts, two commercially available yeast foods, and potassium bromate alone as a control.

The resulting sponge was fermented at 80° F. and 90% relative humidity for 4.0 hours. It was then returned to the mixing bowl which contained the following dough ingredients:

| Ingredient | Parts by Wt. (or Baker's Percentage) |
|---|---|
| Flour (Baker's patent) | 30 |
| Water | 23 |
| Sugar | 5 |
| Salt | 2 |
| Milk substitute (Dari-Pro 35-Ralston Purina) | 2 |
| Calcium propionate (Mold inhibitor) | .25 |

After a short incorporative mix at low speed, the doughs were mixed at high speed to obtain those physical properties referred to as a fully developed pliable dough. The dough so mixed was then returned to the trough at 80° F. and given 30 minutes flour time. The doughs were then divided to give duplicate masses of 454 grams which were rounded and given an overhead proof of 10 minutes. They were then sheeted, curled and molded and placed in pans. The loaves were proofed at 112° F. to ¾" above the pan lips and then were baked in a reel oven at 435° for 20 minutes. It will be understood that all these factors and operations were controlled and identical, so that only variations in the dough conditioners, yeast foods and the like included at the sponge level were being evaluated for their effects upon the finished bread.

It is standard practice to determine the volume of such test loaves by a rape seed displacement procedure and to give them a quality score based upon a subjective evaluation of color and nature of crust, loaf symmetry, texture and color of crumb, grain and odor and taste. As a practical matter, 100 score bread is an unattainable ideal, with 80 score bread being just salable, while a 90 score bread is excellent, with the usual commercial bread scoring being about 82-86. pH determinations were made on the bread after measuring and scoring using the American Association of Cereal Chemists-Approved Methods 02-52(1969).

The results of these evaluations tests are presented in the following Table I:

TABLE I

| Bake Test No. | Acid | Conditioner Type | Loaf Vol. c.c. | Quality Score | Bread pH |
|---|---|---|---|---|---|
| 1. | Tartaric Acid | 1 | 2425 | 85 | 5.28 |
| 2. | Citric Acid | 1 | 2567 | 86 | 5.30 |
| 3. | Adipic Acid | 1 | 2425 | 85 | 5.20 |
| 4. | Malic Acid | 1 | 2550 | 86 | 5.20 |
| 5. | Sodium Diacetate | 2 | 2475 | 85 | 5.30 |
| 6. | Sodium Acid Pyrophosphate | 2 | 2425 | 84 | 5.25 |
| 7. | Fumaric Acid | 1 | 2567 | 86 | 5.20 |
| 8. | Monocalcium Phosphate | 2 | 2425 | 83 | 5.30 |
| 9. | Succinic Acid | 1 | 2500 | 86 | 5.22 |
| 10. | Ammonium Chloride | 2 | 2437 | 85 | 5.30 |
| 11. | Ammonium Sulfate | 2 | 2425 | 84 | 5.35 |
| 12. | Arkady* .5% | — | 2487 | 85 | 5.38 |
| 13. | Fermaloid* .5% | — | 2450 | 84 | 5.35 |
| 14. | Control (Potassium Bromate (15 ppm)) | | 2350 | 82 | 5.25 |

*Standard Brands - Fleischmann Bakery Ingredients

It is apparent from the bread pH values that, beyond the initial period in which more optimum fermentation conditions are established, the small amount of acid added with the bromate in the compounds of the present invention has little effect on final bread pH as compared to the lactic and other acid substances elaborated by the yeast fermentation itself and moderated by the buffering action of other normal dough ingredients. Normal white bread pH will vary widely depending upon conditions and formulation but will usually range from 5.1 to 5.6.

Any of these concentrated dough conditioners used in Test Nos. 1-9 (Type 1 and Type 2) represent the essence of the advantages of the present invention. Since a concentrate is desired, compounds represented by Tests Nos. 5, 6, and 8 (Type 2) are inferior since twice as much of the material would be required. In any case, the dough conditioner concentrate would be unsatisfactory if the bromate used were not relatively stable in the presence of the acid employed. These compounds as represented by Test Nos. 1-9 probably indicate that the theoretical maximum concentration of the so-called yeast food functions possible using this method is by a factor of about 10.

Test II

A series of yeast food compounds were formulated to be approximately ten times as active as the usual or traditional yeast food products. These were prepared in 100 gram size lots using powdered ingredients and a kitchen blender for mixing. After mixing, the preparations were placed in plastic bags, air was largely removed and the bags were heat sealed and stored at room temperature in the dark. The specimens were examined at daily intervals until gross changes such as yellow color (bromine and gas liberation (nitrogen) resulting in bag expansion or rupture were noted.

| Compound Ingredient | Yeast Food Concentrates | | | | | | | | |
|---|---|---|---|---|---|---|---|---|---|
| | 1 | 2 | 3 | 4 | 5 | 6 | 7 | 8 | 9 |
| Potassium Bromate | 3 gm | 3 gm | 3 gm | 3 gm | 3 gm | 3 gm | 3 gm | 2.5 gm | 2.5 gm |
| Potassium Iodate | — | — | — | — | — | — | — | .5 | .5 |
| Ammonium Chloride | 71 | 71 | 71 | 71 | 71 | — | — | 71 | 71 |
| Ammonium Sulfate | — | — | — | — | — | 88.4 | 88.4 | — | — |
| Fumaric Acid | — | .5 | 1.5 | 3 | 6 | — | — | — | 6 |
| Calcium Sulfate | 23 | 22.5 | 21.5 | 20 | 17 | 8.6 | 8.6 | 23 | 17 |
| Tricalcium Phosphate | 3 | 3 | 3 | 3 | 3 | — | — | 3 | 3 |
| Decomposition Noted-Day | 14 | 14 | 14 | 14 | 14 | 2 | 2 | 16 | 16 |

These formulations represent a serious effort to formulate the Arkady and Fermaloid type yeast foods in concentrated forms. The oxidants were the usual potassium bromate and iodate, the acidulent was primarily either ammonium chloride or sulfate which was reduced slightly but the action was fortified with fumaric acid. The calcium sulfate was a normal diluent used to make the strength of oxidizer ten times normal. The tricalcium phosphate was also a diluent which functions as a flow agent.

The yeast foods all showed gross and obvious decomposition in less than three weeks. This experiment demonstrated the impracticality of making a useful concentrated yeast food with anything approaching a traditional formulation with a satisfactory shelf and storage life. The results suggest strongly a basic incompatibility between potassium bromate and ammonium salts. Ammonium sulfate appeared to be more reactive than the chloride. Fumaric acid, present or absent, had little effect.

The very real function of such traditional components as salt, starch and calcium sulfate or calcium acid phosphate was obviously more than that of diluent or filler. They physically separated to a large extent the active and interactive oxidant and ammonium salts.

One answer to the problem of making a concentrate was to physically separate the reactive components in individual packages as in the two packet system of "Short Cut". Another would be to develop new compounds possessing the expected functions of the yeast food but using components which were mutually compatible. The two packet system, of course, would not permit the use of the automatic metering devices by which the most effective injection of the conditioning agent into a flour stream can be effected.

Test III

The concentrated dough conditioners of the present invention consisting essentially of a solid acid material and potassium bromate were found by bake test to be at least as functional as conventional yeast foods wherein ammonium salts and calcium salts have been considered mandatory heretofore for such functionality. On the other hand, the yeast food concentrates, while fresh, also function to an extent but are practically useless because of their very short storage life in which the potassium bromate remained reasonably intact.

To evaluate the storage life of the 10:1 and the 5:1 concentrated dough conditioners prepared as in Test I, eighty grams of each such preparation were placed in a plastic bag. the bag was flattened to remove air from the head space and the bag heat sealed.

The sealed bags of the dough conditioners were then stored at room temperature and in the dark and examined periodically for spoilage by decomposition, as described in Test II. The results are tabulated as follows:

TABLE III

| No. | Acid Comp. | % Acid | % KBrO$_2$ | Storage Results | |
|---|---|---|---|---|---|
| 1. | Tartaric acid | 97 | 3 | Decomposition | 1–3 days |
| 2. | Citric Acid (Monohydrate) | 97 | 3 | Stable | 45 days |
| 3. | Adipic Acid | 97 | 3 | Stable | 45 days |
| 4. | Malic Acid | 97 | 3 | Stable | 45 days |
| 5. | Sodium Diacetate | 98.5 | 1.5 | Stable | 45 days |
| 6. | Sodium Acid Pyrophosphate | 98.5 | 1.5 | Stable | 45 days |
| 7. | Fumaric Acid | 97 | 3 | Stable | 45 days |
| 8. | Monocalcium Phosphate | 98.5 | 1.5 | Stable | 45 days |
| 9. | Succinic Acid | 97 | 3 | Stable | 45 days |
| 10. | Ammonium Chloride | 98.5 | 1.5 | Decomposition | 7 days |
| 11. | Ammonium Sulfate | 98.5 | 1.5 | Decomposition | 4 days |

This test data illustrates results both expected and unexpected. The compounds containing ammonium chloride and sulfate were unstable and decomposed as indicated by bromine and oxygen release and verify the practical uselessness of attempting a traditional yeast food of a concentrated nature in which the ammonium salt and the potassium bromate are in close physical contact.

The extreme sensitivity of the tartaric acid in contact with potassium bromate was not expected and was accepted only after repetitive tests. The release of bromine was obvious. the other gases elaborated were not specifically identified. Oxygen and carbon dioxide resulting from a decarboxylation reaction were suspected.

The remainder of the acid substances of test Nos. 2–9 are satisfactory for the preparation of active dough conditioners. Citric acid and the sodium diacetate were considered somewhat less desirable because of a tendency to lump in storage. Sodium acid pyrophosphate and monocalcium phosphate were less desirable because of the higher equivalent weights and a less satisfactory flavor. On the basis of subjective flavor, fumaric acid and malic were preferred. All of these acids blended with potassium bromate at about a ratio of 30–40:1 represent the dough conditioners of this invention in its basic concept. The economics of fumaric acid and its secondary function as a mixing time reducer make it particularly acceptable in the dough conditioner.

Test IV

The purpose of this test was to determine the range of levels at which a solid acid could be used in the instant dough conditioner in combination with a constant bromate level to yield results approximating a typical present day non-concentrated yeast food.

Bake tests were conducted in the manner described in Test I in which the yeast food or conditioner component in the sponge formula was replaced by one of the seven compositions given below in Table IV used at the level indicated (based on flour).

TABLE IV

| Compound No. | Level | Fumaric Acid | CaSO$_4$ | KBrO$_3$ |
|---|---|---|---|---|
| 1 | .50% Arkady | — | — | — |
| 2 | .0015% KBrO$_3$ | — | — | — |
| 3 | .050% | 65.8% | 31.2% | 3.0% |
| 4 | .050% | 79.0 | 18.0 | 3.0 |
| 5 | .050% | 87.8 | 11.2 | 3.0 |
| 6 | .050% | 96.6 | .4 | 3.0 |
| 7 | .056% | 97.3 | — | 2.7 |

The pH of the dough directly from the mixer was checked by enrobing the probe of the pH meter in the dough. The pH at this point normally indicates the progress of fermentation and action of the amylases of importance in panary fermentation. Malt diastases present are most active at a pH of about 4.8.

The bread obtained was measured for volume, scored subjectively and the pH of its crumb determined. The results are given below in Table V.

TABLE V

| Compound Tested | Dough pH | Loaf Vol. | Quality Score | Crumb pH |
|---|---|---|---|---|
| 1 | 5.30 | 2350 | 86 | 5.28 |
| 2 | 5.40 | 2300 | 84 | 5.18 |
| 3 | 5.28 | 2412 | 85 | 5.20 |
| 4 | 5.21 | 2412 | 85 | 5.20 |
| 5 | 5.20 | 2400 | 86 | 5.18 |
| 6 | 5.13 | 2425 | 86 | 5.12 |
| 7 | 5.10 | 2412 | 86 | 5.10 |

The results indicate that the compounds of this invention can be completely functional with acid to bromate ratios between 33:1 to 49:1 when the acid is fumaric acid. Since fumaric acid has the lowest equivalent weight of those examined, a minimum ratio of about 30:1 solid acid to potassium bromate is indicated. The upper limit would be about twice the ratio indicated above for an acid like sodium diacetate or about 100:1. The range of acid to bromate in general is indicated to be about 30-100:1. The results indicated that the instant compounds yielded bread at least as good as that obtained from a conventional yeast food with possibly a slight advantage as to volume and flavor. The slightly lower pH would also insure better mold resistance. The function of the calcium sulfate in the formulations employed was to simplify weighing of the conditioners for use. It will be apparent that should variations in bromate activity be required for a particular flour that sufficient acid activity is available in the compounds, at least Tests No. 5-No. 7, to permit this just as is done currently with yeast foods.

Test VI

This test was devised to establish the effect upon the pH of the sponge and dough mass at crucial intervals through the bread making process of the concentrated dough conditioners of this invention. The purpose was to relate any effects noted to the observed functionality of the conditioners and to compare these effects with those caused by a similar effective level of a commercial yeast food containing ammonium chloride.

Accordingly, the bread making process as described in Test I was employed using the following ingredient at the level (Bakers percentage) indicated:

| | | |
|---|---|---|
| Test Dough 1 | Dough Conditioner Formula B | .05% |
| | Fumaric Acid | 87.2% |
| | Potassium Bromate | 3% |
| | Colloidal Silica (Aerosol 200 Degussa Corp.) | 1% |
| | Calcium Sulfate | 8.8% |
| Test Dough 2 | Yeast Food (Arkady Type) | .5% |
| Test Dough 3 | Potassium Bromate (Control) | .0015% | pH determinations were made using an electronic pH meter with a glass electrode probe. The procedure for the sponge and dough measurements was to enrobe the probe with the moist mass. Bread pH was made using the AACC procedure 12 hours after baking. The times during the processing of the doughs at which pH was measured were as follows:

| | | Age (approx.) |
|---|---|---|
| A. | Sponge directly from mixer | 3-5 min. |
| B. | Sponge after 2 hours fermentation | 2 hours |
| C. | Sponge after fermentation - 4 hours | 4 hours |
| D. | Dough directly from mixer | 4 hours |
| E. | Pan proofed dough | 5 hours |
| F. | Bread 12 hours from oven | |

The pH values as determined are tabulated below:

| | pH at Time | | | | | |
|---|---|---|---|---|---|---|
| | A. | B. | C. | D. | E. | F. |
| Test Dough 1 | 5.23 | 5.00 | 4.90 | 5.20 | 4.85 | 5.20 |
| Test Dough 2 | 5.48 | 5.20 | 4.68 | 5.00 | 4.80 | 5.40 |
| Test Dough 3 | 5.60 | 5.40 | 5.12 | 5.30 | 4.80 | 5.30 |

The results reveal that the concentrated dough conditioners lowered the initial pH rapidly and drastically and maintained the acid relatively level throughout the processing procedure and to final product. The yeast food reduced the initial pH and allowed it to fall much more during fermentation. Evidently some of the ammonium chloride is consumed in the yeast action and hydrochloride acid released. The net result with both was a bread of improved quality. The dough without an acidifier had a significantly higher pH throughout the process. The final bread pH was not greatly different, however. Its variability more closely resembled that of the yeast food but at a higher pH level. This would account for the effects on bread quality because conditions during the long fermentation period would be less favorable for the bromate effect, diastatic and other enzyme action, and yeast fermentation in general. The low pHs in all cases in the gassy sponge (Time C) and at the end of pan proof (Time 4) is related to the saturation of the systems with carbon dioxide to a greater or lesser extent. Removal of this carbon dioxide either mechanically or by heat accounts, in large part, in the elevations noted (Times D and F).

It is clear the acid containing concentrated conditioning agent is functioning differently from the ammonium salt containing yeast food but that the end results are essentially the same, an improved bread loaf. This is indicated by the evaluation of the products as listed below.

| | Loaf Vol. (Av.) | Quality Score |
|---|---|---|
| Test Dough 1 | 2312 | 86 |
| Test Dough 2 | 2275 | 85 |
| Test Dough 3 | 2225 | 83 |

Test VII

It has been shown that dough conditioners can be formulated as in Test I to have the functionality of about ten times that of the traditional yeast food. Aside from this functionality in baking, the dough conditioner should be capable of prolonged storage in bags without lumping or cementing. It should have flow properties fitting it for use in the latest automatic scaling devices and would advantageously have some "round number" factor of baking equivalence to yeast foods to simplify scaling in the bake shop.

This test is intended to indicate materials suitable for those purposes in specific tests. These materials are fillers, flow agents and anti-lumping agents. They must, of course, be compatible with the acid-bromate conditioners. The most satisfactory and economical fillers are inorganic salts, examples of which are calcium sulfate and sodium chloride. The most satisfactory and economical flow agent found is tricalcium phosphate although colloidal silica is also effective in this regard. Both of these are effective in minimizing lumping as well. The most convenient ratio of activity for the baker for these concentrates is 1/10th or ⅛th of the amount of yeast food he employs, normally 0.5% or 8 ounces per 100 pounds of flour in his formula.

This is readily accomplished with a conditioner such as was used in Test No. V. The basic conditioner would have the following formula and a nominal usage level of 0.045%:

Type Conditioner A

Fumaric Acid: 96.67%
Potassium Bromate: 3.33%

This formulation can be converted to one with a more convenient usage level of 0.050%, as in Test No. V, and obtain a product ten times as active as yeast foods.

Type Conditioner B

Fumaric Acid: 87.2%
Potassium Bromate: 3.0%
Calcium Sulfate: 8.8%
Colloidal Silica: 1.0%

Bakers usually calculate the small ingredients in ounces per 100 pounds of flour. Thus, an activity of eight times or a usage of ⅛ as compared to the replaced yeast food would be a convenient activity for the instant conditioner. The usage level would then be one ounce per 100 pounds of flour or 0.0625%. Such a formula as given below.

Type Conditioner C

Fumaric Acid: 70.00%
Potassium Bromate: 2.40
Sodium Chloride: 5.12
Calcium sulfate: 19.48
Tricalcium phosphate: 3.00

It will be apparent to those skilled in the art that other materials, active or inactive, can be included in these formulations without altering the first function as a dough conditioner. Obvious possibilities of active additives are concentrated enzyme preparations, vitamin concentrates, mold inhibitors and the like, which are used at near constant levels in the bread formulations.

Test VIII

This test illustrates the stability of the concentrated dough conditioners on storage. The compound used was that described in Test VI as in Type Conditioner C. A 1500 pound batch was blended in a ribbon blender and packed off in 50 pound plastic and paper multi-walled bags. These were stored under normal warehouse conditions for a period including the summer months. Periodically samples were taken for assay with the potassium bromate content being determined by an acceptable iodimetric technique in which ammonium molybdate was used as a catalyst.

| Storage Time Days | Potassium Bromate Content % |
| --- | --- |
| 0 | 2.3902 |
| 30 | 2.3910 |
| 122 | 2.3882 |
| 279 | 2.3886 |

The results of the assays above indicate very satisfactory storage stability under usual conditions for at least a nine month period, and probably much longer, without noticeable loss of the bromate content and function.

I claim:

1. A stable dough conditioning composition for addition in a concentrated form to yeast-leavened dough to eliminate the need for the addition of ammonium salts to said dough, said composition consisting essentially of the following active ingredients:
   a solid organic acid: 60–98%
   A bromate salt compatible with said acid: 0.4–4%.

2. A dough conditioning composition in accordance with claim 1 wherein the solid organic acid is fumaric acid and the bromate salt is potassium bromate.

3. A dough conditioning composition in accordance with claim 1, wherein said composition consists essentially of about 97% fumaric acid and about 3% potassium bromate.

4. A stable dough conditioning composition in accordance with claim 1 wherein said composition consists essentially of the following ingredients:
   Malic Acid: 88.183%
   Potassium Bromate: 2.575%
   Tricalcium Phosphate: 3.175%
   Calcium Sulfate: 5.067%
   Colloidal Silica: 1.000%.

5. A dough conditioning composition in accordance with claim 1 which further includes therein 0–35% of compatible additive compounds to improve the physical properties of said dough conditioning composition.

6. A stable dough conditioning composition in accordance with claim 1 wherein said composition consists essentially of the following ingredients:
   a solid organic acid selected from the group consisting essentially of adipic acid, citric acid, fumaric acid, malic acid, succinic acid, and mixtures of the foregoing: 60–98%
   a bromate salt selected from the group consisting of potassium bromate, sodium bromate and calcium bromate: 0.4–4%.

7. A dough conditioning composition in accordance with claim 6 which further includes therein 0–35% of compatible additive compounds to improve the physical properties of said dough conditioning composition.

8. A stable dough composition in accordance with claim 6 wherein said composition further includes from 0–35% of a diluent selected from the group consisting of tricalcium phosphate, calcium sulfate, sodium chloride, fumed silica powder and mixtures of the foregoing.

9. The method of improving the production of yeast-leavened dough products comprising adding to the dough the dough conditioning composition of claim 1 in an amount of about 0.05% to 0.0625% (Bakers percentage).

10. The method of improving the production of yeast-leavened dough products without the addition of ammonium salts thereto comprising adding to the dough the dough conditioning composition of claim 5 in an amount of about 0.05% to 0.0625% (Bakers percentage).

11. The method of improving the production of yeast-leavened dough products without the addition of ammonium salts comprising adding to the dough the dough conditioning composition of claim 6 in an amount of about 0.025 to 0.075 parts dry weight to each 100 parts of flour used in such dough products.

12. The method of improving the production of yeast-leavened dough products comprising adding to the dough the dough conditioning composition of claim 8 in an amount of about 0.025 to 0.075 parts dry weight to each 100 parts of flour used in such dough products.

* * * * *